(12) United States Patent
Kondo

(10) Patent No.: US 8,188,711 B2
(45) Date of Patent: May 29, 2012

(54) CHARGER FOR BATTERY PACKS AND COMBINATION OF BATTERY PACKS AND A CHARGER

(75) Inventor: Eiji Kondo, Anjo (JP)

(73) Assignee: Makita Corporation, Anjo-shi (JP)

( * ) Notice: Subject to any disclaimer, the term of this patent is extended or adjusted under 35 U.S.C. 154(b) by 903 days.

(21) Appl. No.: 12/155,384

(22) Filed: Jun. 3, 2008

(65) Prior Publication Data

US 2008/0315832 A1    Dec. 25, 2008

(30) Foreign Application Priority Data

Jun. 22, 2007  (JP) .................................. 2007-165080

(51) Int. Cl.
*H02J 7/00* (2006.01)
(52) U.S. Cl. ........................ 320/110; 320/107; 320/113
(58) Field of Classification Search ................... 320/107, 320/110, 113, 116
See application file for complete search history.

(56) References Cited

U.S. PATENT DOCUMENTS

| | | | |
|---|---|---|---|
| 5,148,094 A | 9/1992 | Parks et al. | |
| 7,859,220 B2 * | 12/2010 | Bushong et al. | ............. 320/107 |
| 2003/0085685 A1 | 5/2003 | Usui et al. | |
| 2006/0087281 A1 * | 4/2006 | Tong | ............................ 320/106 |

FOREIGN PATENT DOCUMENTS

| | | |
|---|---|---|
| CN | 2686107 Y | 3/2005 |
| EP | 0 332 475 A2 | 9/1989 |
| EP | 0 470 754 A2 | 2/1992 |
| JP | U-55-81265 | 6/1980 |
| JP | A-4-253171 | 9/1992 |
| JP | A-6-089744 | 3/1994 |
| JP | A-8-130038 | 5/1996 |
| JP | A-2000-268883 | 9/2000 |
| JP | A-2004-289897 | 10/2004 |

OTHER PUBLICATIONS

Office Action issued in Japanese Application No. JP 2007-165080 dated Feb. 8, 2011 (with translation).
Office Action Issued in Chinese Patent Application No. 200810127115.1 dated Oct. 11, 2010 (With Translation).
Extended European Search Report issued in corresponding European Application No. 08010187.6, dated Nov. 8, 2010.
Oct. 25, 2011 Office Action issued in Japanese Patent Application No. 2007-165080 (with English translation).

* cited by examiner

*Primary Examiner* — Edward Tso
*Assistant Examiner* — Aaron Piggush
(74) *Attorney, Agent, or Firm* — Oliff & Berridge, PLC

(57) ABSTRACT

A charger is adopted to charge a first-type battery pack and a second-type battery pack, each type of battery packs having an insertion portion whose shapes are different. The charger is provided with a housing having a battery pack socket for inserting the battery packs. The battery pack socket has a shape that allows the insertion portion of the first-type battery pack and the insertion portion of the second-type battery pack to be inserted thereto selectively in a prescribed attitude. A pair of output terminals that output charging power is disposed within the battery pack socket. The pair of output terminals is electrically connected to the first-type battery pack when the insertion portion of the first-type battery pack is inserted into the battery pack socket in the prescribed attitude. Likewise, the pair of output terminals is electrically connected to the second-type battery pack when the insertion portion of the second-type battery pack is inserted into the battery pack socket in the prescribed attitude.

16 Claims, 7 Drawing Sheets

CHARGER FOR BATTERY PACKS AND COMBINATION OF BATTERY PACKS AND A CHARGER

CROSS-REFERENCE TO RELATED APPLICATION

This application claims priority to Japanese Patent Application No. 2007-165080, filed on Jun. 22, 2007, the contents of which are hereby incorporated by reference into the present application.

BACKGROUND OF THE INVENTION

1. Field of the Invention

The present invention relates to a technique of charging a battery pack. Particularly, the invention relates to a technique of charging various types of battery packs with a single charger.

2. Description of the Related Art

Many electric appliances such as a portable electric power tool powered by a detachable battery pack are used. Rechargeable battery cells, which can be charged repeatedly by a charger, are installed in the battery pack used in this type of electric appliances.

Battery packs are designed in various shapes in accordance with electric appliances in which they are used, and therefore an exclusive charger is provided respectively for each type of battery packs. Accordingly, in a case which users use various types of electric appliances, the users must selectively use various types of chargers in accordance with the types of battery packs.

With regard to the above-described problem, Japanese Patent Application Publication No. 2004-289897 describes a technique for charging various types of battery packs with a single charger. In this technique, an adapter arranged between a battery pack and a charger is utilized for the purpose of connecting battery packs having different shapes to a single charger.

BRIEF SUMMARY OF THE INVENTION

The technique of Japanese Patent Application Publication No. 2004-289897 requires at least one adapter in order to charge two types of battery packs with a single charger. Therefore, users who use more types of battery packs must prepare a large number of adapters in order to charge each of the battery packs with a single charger. There is a need for a technique that enables charging different types of battery packs with a single charger, without the use of adapters.

The technique of the present teachings provides a charger adopted to charge either one of a first-type battery pack and a second-type battery pack. Each of the first-type battery pack and a second-type battery pack has an insertion portion. The shape of the insertion portion of the first-type battery pack is different from the shape of the insertion portion of the second-type battery pack. The charger is provided with a housing having a battery pack socket, a charging control unit housed in the housing and at least a pair of output terminals disposed in the battery pack socket.

The battery pack socket is constructed such that the insertion portion of the first-type battery pack and the insertion portion of the second-type battery pack can be selectively inserted into the battery pack socket in a prescribed attitude. The battery pack socket preferably has a shape that does not allow insertion of the insertion portion of the first-type battery pack that is not in the prescribed attitude. Likewise, the battery pack socket preferably has a shape that does not allow insertion of the insertion portion of the first-type battery pack that is not in the prescribed attitude.

The pair of output terminals is electrically connected to the first-type battery pack when the insertion portion of the first-type battery pack in the prescribed attitude is inserted into the battery pack socket. Likewise, the pair of output terminals is electrically connected to the second-type battery pack when the insertion portion of the second-type battery pack in the prescribed attitude is inserted into the battery pack socket.

As for the charger, the first-type battery pack can be inserted into the battery pack socket in the prescribed attitude, making electrical connection to the output terminals after the insertion. Likewise, the second-type battery pack can be inserted into the battery pack socket in a prescribed attitude, and making electrical connection to the output terminals after the insertion. The battery pack connected to the output terminals is charged by charging power from the charging control unit. The charger can charge the first-type battery pack as well as the second-type battery pack, without using any adapters.

The battery pack socket preferably has a partial area for commonly accepting a part of the first-type battery pack and a part of the second-type battery pack. In accepting the first-type battery pack into the battery pack socket and in accepting the second-type battery pack likewise, parts of the first-type battery pack and the second-type battery pack fit into the partial area. That is, the partial area overlappingly accepts the first-type battery pack and the second-type battery pack. As a result, the size of the battery pack socket can be reduced and thereby the size of the charger can be reduced.

In a case where each of the first-type battery pack and the second-type battery pack has at least a pair of electrode terminals, and a positional relationship of the pair of electrode terminals of the first-type battery pack is identical with a positional relationship of the pair of electrode terminals of the second-type battery pack, it is preferable that the pair of the output terminals can be selectively connected to the pair of electrode terminals of the first-type battery pack and the pair of electrode terminals of the second-type battery pack. As a result, the number of terminals required within the battery pack socket decreases, and simple circuit configuration between output terminals and the charging control unit can be realized thereby.

A projecting portion is preferably formed within the battery pack socket in an area of the battery pack socket where the second-type battery pack fits but the first-type battery pack does not fit. The projecting portion can prevent the first-type battery pack from being inserted in attitudes other than the prescribed attitude.

The technique according to the present teachings is suitably applied to a charger for the first-type battery pack that comprises two battery cells arranged parallel to one another; and the second-type battery pack that comprises three battery cells arranged parallel to one another to form a triangular configuration.

DETAILED DESCRIPTION OF THE INVENTION

Below are some of the characteristic features of an embodiment of the invention (Feature 1) The case of the first-type battery pack houses two battery cells. The case of the first-type battery pack is formed in a pillar shape having an approximately elliptic cross-sectional shape. The one end portion of the case of the first-type battery pack is the insertion portion for inserting the battery pack socket.

(Feature 2) The case of the second-type battery pack houses three battery cells. The case of the second-type battery pack is formed in a pillar shape having a cross-sectional shape where one ellipse is connected to an approximately half ellipse in a T-shape. The one end portion of the case of the second-type battery pack is the insertion portion for inserting the battery pack socket.

(Feature 3) The pair of electrode terminals of the first-type battery pack and a pair of electrode terminals of the second-type battery pack have substantially the same structures as each other. Furthermore, the positional relationship of the pair of electrode terminals of the first-type battery pack is identical with the positional relationship of the pair of electrode terminals of the second-type battery pack.

(Feature 4) The first-type battery pack includes two lithium-ion battery cells and their nominal output voltage is 7.2V. The second-type battery pack includes three lithium-ion battery cells and their nominal output voltage is 10.8V.

(Feature 5) The charging control unit of the charger detects a type of battery pack inserted into the battery pack socket based on a voltage between the pair of output terminals, and changes charge control process depending on the type of battery pack detected.

Embodiment of the Invention

Figure 1:
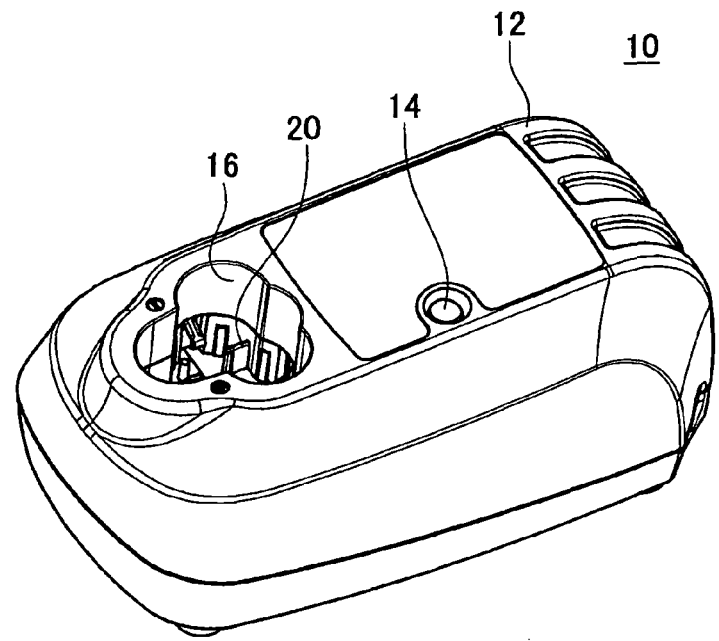
FIG. 1 is a perspective view of a charger.
Figure 2:
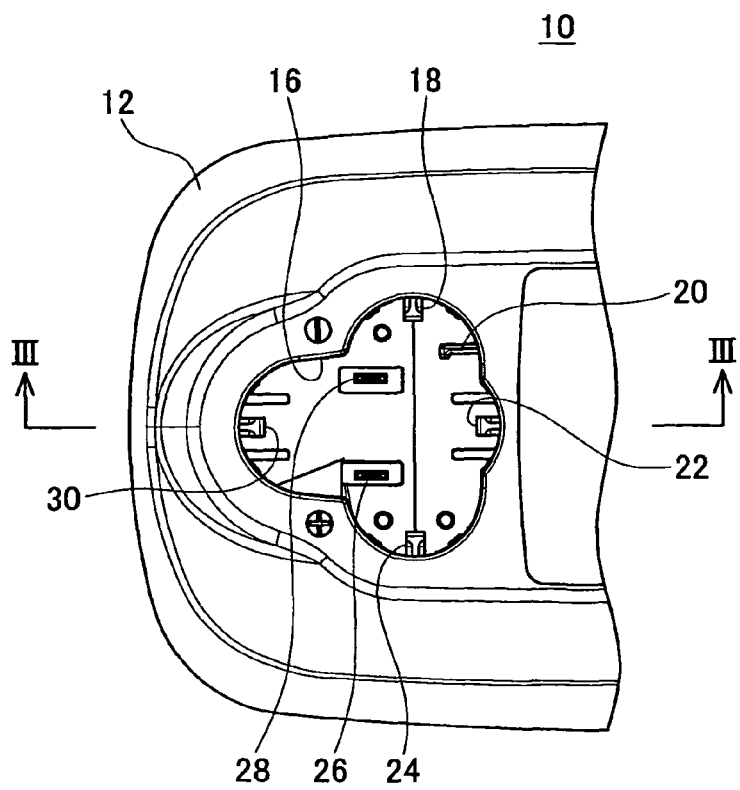
FIG. 2 is an enlarged plan view showing a battery pack socket of the charger.
Figure 3:
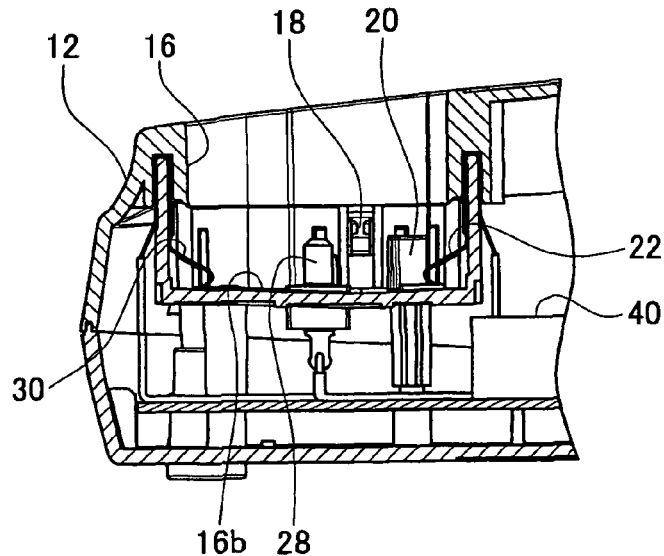
FIG. 3 is a sectional view of line III-III of FIG. 2.
Figure 4:
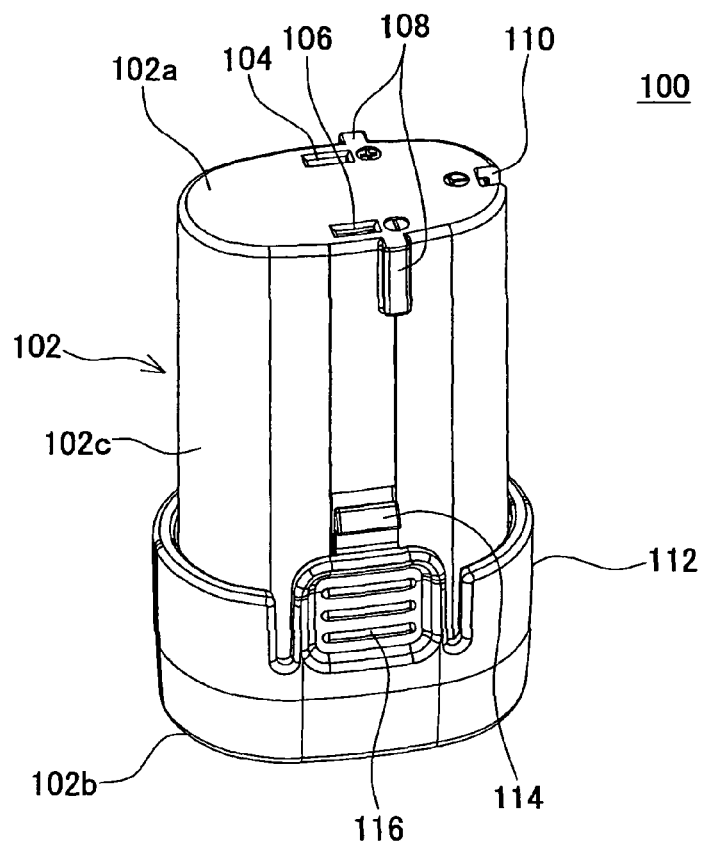
FIG. 4 is a perspective view of a first-type battery pack.
Figure 5:
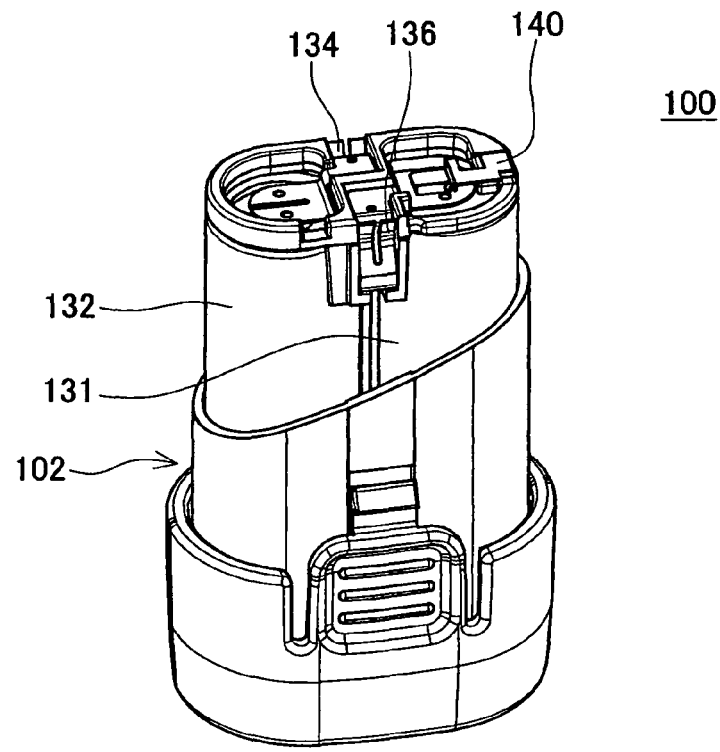
FIG. 5 is a perspective view of the first-type battery pack with a part of a case is removed.
Figure 6:
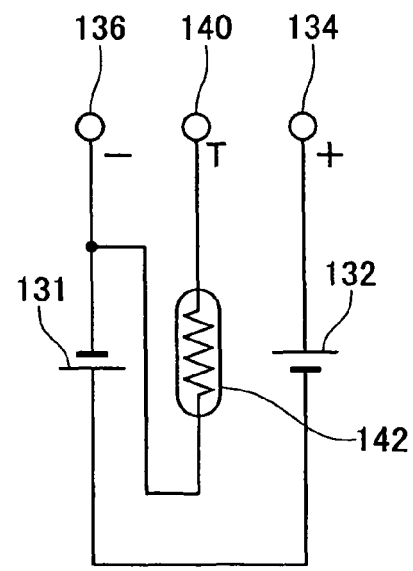
FIG. 6 is a circuit diagram of the first-type battery pack.
Figure 7:
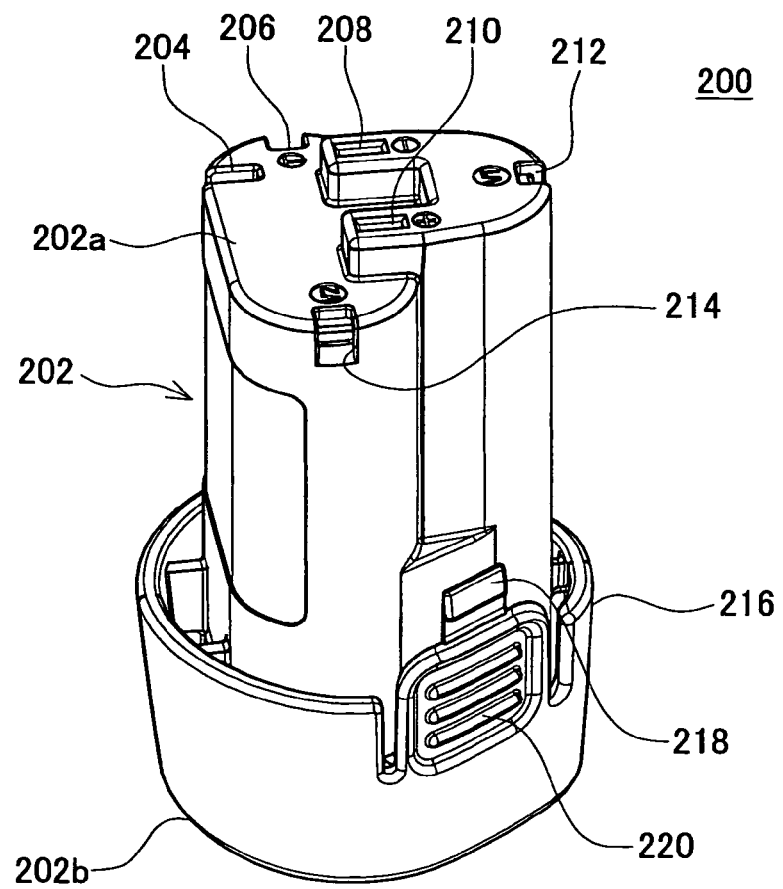
FIG. 7 is a perspective view of a second-type battery pack.
Figure 8:
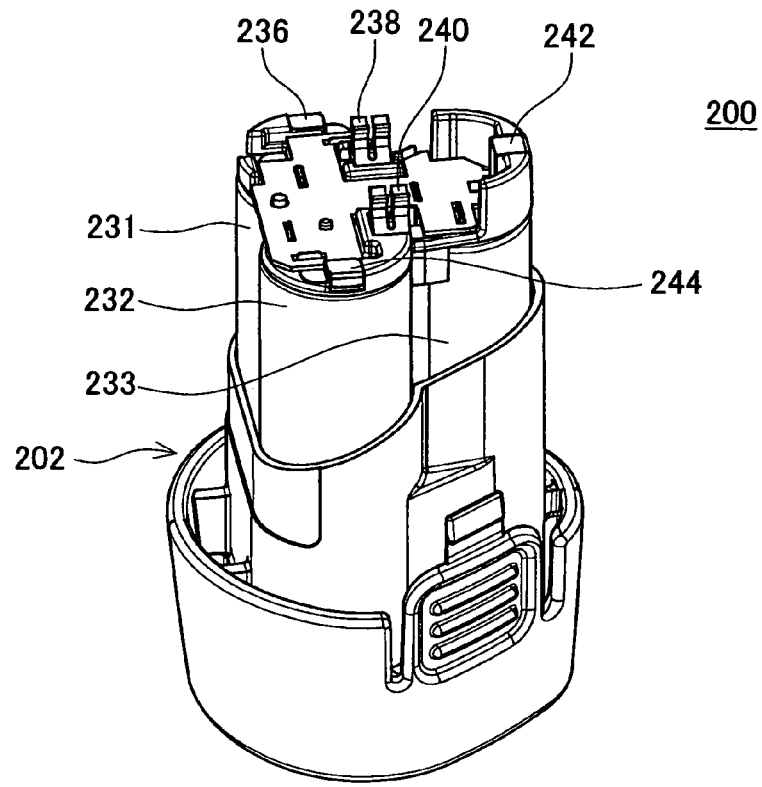
FIG. 8 is a perspective view of the second-type battery pack with a part of a case is removed.
Figure 9:
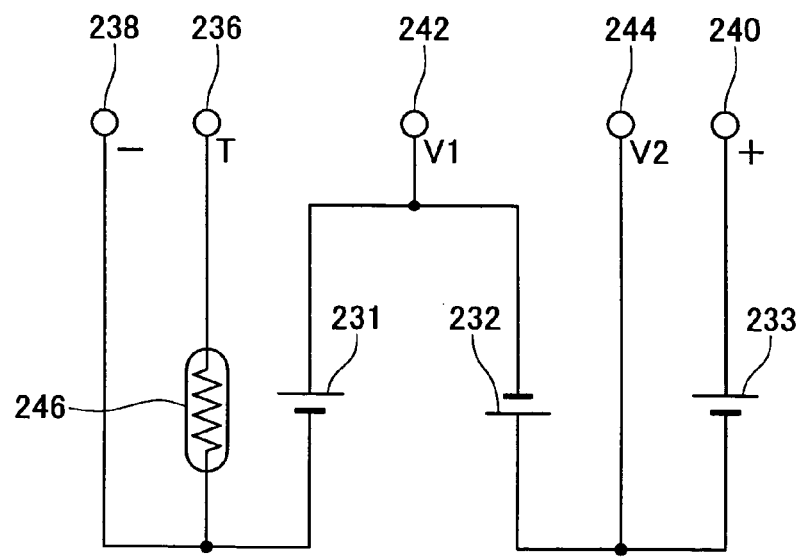
FIG. 9 is a circuit diagram of the second-type battery pack.

A description with reference to the drawings will be given for a battery pack set of an embodiment of the present teachings. The battery pack set of the present embodiment includes a charger 10 as shown in FIGS. 1 to 3, a first-type battery pack 100 as shown in FIGS. 4 to 6, and a second-type battery pack 200 as shown in FIGS. 7 to 9. The first-type battery pack 100 and the second-type battery pack 200 are rechargeable battery packs. The first-type battery pack 100, whose output voltage is approximately 7.2V, is a battery pack attached to a portable electric power tool of relatively small size. The second-type battery pack 200, whose output voltage is approximately 10.8V, is a battery pack attached to a portable electric power tool of relatively large size. The battery pack set of this embodiment includes the two types of battery packs 100 and 200 having different shapes and output voltages, and the charger 10 that charges the battery packs 100 and 200.

Referring to FIGS. 1 to 3, description on the configuration of the charger 10 will be given below. FIG. 1 is the perspective view showing the charger 10. FIG. 2 is the partial plan view showing battery pack socket 16 of the charger 10 in an enlarged manner. FIG. 3 shows the sectional view taken along line III-III of FIG. 2.

As shown in FIG. 1, the charger 10 includes a housing 12. The housing 12 has a battery pack socket 16 for inserting the battery packs 100 and 200 to be charged. As shown in FIG. 2, an opening shape of the battery pack socket 16 has a shape which two ellipses orthogonal to one another are overlapped, with the centers of the ellipses are arranged along a longitudinal center line of one of the ellipses. As shown in FIGS. 1 to 3, a plate-shaped projecting portion 20 is formed in the battery pack socket 16. As shown in FIG. 3, the plate-shaped projecting portion 20 extends from a bottom plate 16b of the battery pack socket 16. Further, the charger 10 includes a charging control unit 40 housed in the housing 12. The charging control unit 40 supplies charging power for charging the battery packs 100 and 200.

As shown in FIG. 2 and FIG. 3, a pair of output terminals 26 and 28 is provided within the battery pack socket 16. The pair of output terminals 26 and 28 consists of a pair of metal plates that are parallel to one another, and extend upward from the bottom plate 16b of the battery pack socket 16. The pair of output terminals 26 and 28 is electrically connected to the first-type battery pack 100 when the first-type battery pack 100 is inserted into the battery pack socket 16. Likewise, the pair of output terminals 26 and 28 is electrically connected to the second-type battery pack 200 when the second-type battery pack 200 is inserted into the battery pack socket 16. The pair of output terminals 26 and 28 is electrically connected to the charging control unit 40. The charging control unit 40 supplies charging power to the first-type battery pack 100 and the second-type battery pack 200 via the pair of output terminals 26 and 28. The configuration of the first-type battery pack 100 and the second-type battery pack 200 will be described later.

A first temperature input terminal 22, a second temperature input terminal 18, a first intermediate voltage input terminal 30, and a second intermediate voltage input terminal 24 are provided inside the battery pack socket 16. These terminals 18, 22, 24, and 30 are also connected to the charging control unit 40.

Next, referring to FIGS. 4 to 6, a description will be given for the configuration of the first-type battery pack 100. FIG. 4 is the perspective view of the first-type battery pack 100. Although FIG. 5 is also the perspective view of the first-type battery pack 100, note that a part of a case 102 is removed to illustrate the inside of the first-type battery pack 100. FIG. 6 is the circuit diagram showing the electrical connection structure of the first-type battery pack 100.

The first-type battery pack 100 includes two battery cells 131 and 132 and a case 102 that houses the two battery cells 131 and 132. Each battery cell 131 and 132, whose nominal output voltage is approximately 3.6V, is a lithium-ion battery cell having a columnar shape. Note that actual output voltage changes depending on a charged state and may exceed 4.0V. The two battery cells 131 and 132 are placed side by side and in parallel to one another, with side surfaces in contact with one another. The two battery cells 131 and 132 are electrically connected in series.

A positive electrode terminal 134 and a negative electrode terminal 136 are also housed inside the case 102. The positive electrode terminal 134 contacts and is electrically connected to the cathode of the battery cell 132. The negative electrode terminal 136 contacts and is electrically connected to the anode of the other battery cell 131. Specifically, the positive electrode terminal 134 and the negative electrode terminal 136 are electrically connected to the ends of the series-wired battery cells 131 and 132. The first-type battery pack 100 outputs a nominal voltage of 7.2V from the pair of the electrode terminals 134 and 136.

Moreover, a temperature detecting terminal 140 and a thermo-sensitive device 142 that is connected to the temperature-detecting terminal 140 (refer to FIG. 6) are housed inside the case 102. The thermo-sensitive device 142 is a thermistor whose resistance value changes with temperature. One end of the thermo-sensitive device 142 is connected to the temperature detecting terminal 140, and the other end of the thermo-sensitive device 142 is connected to the negative electrode terminal 136.

As shown in FIG. 4, the case 102 is formed in a pillar shape having an approximately elliptic cross-sectional shape in order to fit with the external shape of the two battery cells 131 and 132 that are placed side by side therein.

A positive connecting port 104 that exposes the positive electrode terminal 134, a negative connecting port 106 that exposes the negative electrode terminal 136, and a temperature detection connecting port 110 that exposes the temperature detecting terminal 140 are formed on an end portion 102a of the case 102.

A pair of projecting portions 108 is formed on the side surface 102c of the case 102. Each of the pair of projecting portions 108 extends from the one end portion 102a toward the other end portion 102b. The pair of projecting portions 108 extends in the same direction as the first-type battery pack 100 is inserted into the electric power tool or the charger 10. The pair of projecting portions 108 is oppositely arranged at a position that is offset to one side from a center position in the longitudinal diameter direction of the elliptical-shaped cross section of the case 102. The pair of projecting portions 108 prevents incorrect insertion of the first-type battery pack 100 into the battery pack socket 16 of the charger 10.

A cover portion 112 is formed on the other end portion 102b of the case 102. A latch portion 114 for engaging with the electric power tool and a push portion 116 that moves the latch portion 114 are formed on the cover portion 112. The latch portion 114 and the push portion 116 are also formed on a back surface not shown in FIG. 4.

As shown in FIG. 5, the positive electrode terminal 134 and the negative electrode terminal 136 are arranged on both sides of a contact portion where the two battery cells 131 and 132 placed side by side adjoins with one another. Since the two battery cells 131 and 132 are in a columnar shape, wedge-shaped space is formed respectively along both sides of the contact portion of the two battery cells 131 and 132. The first-type battery pack 100 makes use of the wedge-shaped spaces to arrange the positive electrode terminal 134 and the negative electrode terminal 136. Thus, miniaturization of the case 102 is achieved.

Figure 10:
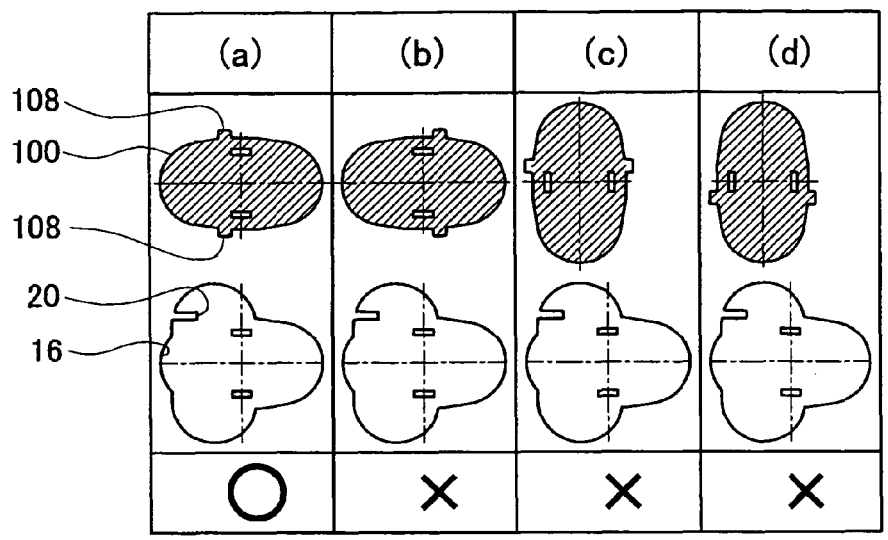
FIG. 10 is a view for explaining inserting directions of the first-type battery pack.

The first-type battery pack 100 is inserted into the battery pack socket 16 of the charger 10 by setting the end portion 102a of the case 102 as the insertion end. The end portion 102a of the case 102 functions as an insertion portion which is inserted into the battery pack socket 16. Herein, as shown in FIG. 10, the first-type battery pack 100 can be inserted into the battery pack socket 16 of the charger 10 only in a prescribed attitude. FIG. 10(a) shows the prescribed attitude of the first-type battery back 100 with which the first-type battery pack 100 can be inserted into the battery pack socket 16. However, with the attitude shown in FIG. 10(b), for example, the projecting portion 108 of the first-type battery pack 100 interferes with the rim of the battery pack socket 16, so that the first-type battery pack 100 is not inserted into the battery pack socket 16. Further, with the attitude shown in FIG. 10(c), the projecting portion 20 of the battery pack socket 16 interferes with the first-type battery pack 100, so that the first-type battery pack 100 is not inserted into the battery pack socket 16. Moreover, even with the attitude shown in FIG. 10(d), the projecting portion 20 of the battery pack socket 16 interferes with the first-type battery pack 100, so that the first-type battery pack 100 is not inserted into the battery pack socket 16. The battery pack socket 16 has a shape that does not allow insertion of the first-type battery pack 100 that is not in the prescribed attitude into the battery pack socket 16.

When the first-type battery pack 100 is inserted into the battery pack socket 16 of the charger 10, the output terminals 26 and 28 of the charger 10 respectively enter the positive connecting port 104 and the negative connecting port 106 of the first-type battery pack 100, making electrical connection with the positive electrode terminal 134 and the negative electrode terminal 136 of the first-type battery pack 100. Further, the first temperature input terminal 22 of the charger 10 enters the temperature detection connecting port 110 of the first-type battery pack 100, making electrical connection with the temperature detecting terminal 140 of the first-type battery pack 100. Accordingly, the charging control unit 40 of the charger 10 is electrically connected to the two battery cells 131 and 132 and the thermo-sensitive device 142 of the first-type battery pack 100. However, no electrical connections are made to the second temperature input terminal 18, the first intermediate voltage input terminal 30 or the second intermediate voltage input terminal 24 of the charger 10. The charging control unit 40 detects that the first-type battery pack 100 has been connected based on voltage between the pair of output terminals 26 and 28, and starts charging control for charging the first-type battery pack 100. Charging power from the charging control unit 40 is supplied to the first-type battery pack 100 through the pair of output terminals 26 and 28. At this point, the charging control unit 40 adjusts a charging current based on detected temperature by the thermo-sensitive device 142 of the first-type battery pack 100.

Next, referring to FIGS. 7 to 9, a description will be given for the configuration of the second-type battery pack 200. FIG. 7 is the perspective view of the second-type battery pack 200. FIG. 8 is also the perspective view of the second-type battery pack 200, but note that a part of a case 202 is removed to illustrate the inside of the second-type battery pack 200. FIG. 9 is the circuit diagram showing the electrical connection structure of the second-type battery pack 200.

The second-type battery pack 200 includes three battery cells 231, 232, and 233 and a case 202 that houses the three battery cells 231, 232, and 233. Each of the battery cells 231, 232, or 233, whose normal output voltage is approximately 3.6V, is a lithium-ion battery cell having a columnar shape. Each of the battery cells 231, 232, and 233 is identical to the battery cells 131 and 132 of the first-type battery pack 100. The three battery cells 231, 232, and 233 are arranged in parallel to one another and form a triangular configuration. The three battery cells 231, 232, and 233 are electrically connected in series.

A positive electrode terminal 240 and a negative electrode terminal 238 are also housed inside the case 202. The positive electrode terminal 240 contacts the cathode of the battery cell 233 to be electrically connected. The negative electrode terminal 238 contacts the anode of the battery cell 231 to be electrically connected. In other words, the positive electrode terminal 240 and the negative electrode terminal 238 are connected to the ends of the series-wired battery cells 231, 232, and 233. The second-type battery pack 200 outputs a voltage of nominal 10.8V from the pair of the electrode terminals 240 and 238.

As shown in FIGS. 5 and 8, the positive electrode terminal 240 and the negative electrode terminal 238 of the second-type battery pack 200 have substantially the same structure as the positive electrode terminal 134 and the negative electrode terminal 136 of the first-type battery pack 100. Further, an interval between the positive electrode terminal 240 and the negative electrode terminal 238 in the second-type battery pack 200 is substantially the same as the interval between the positive electrode terminal 134 and the negative electrode terminal 136 in the first-type battery pack 100. The positional relationship of the pair of the electrode terminals 134 and 136 of the first-type battery pack 100 is identical with the positional relationship of the pair of the electrode terminals 240 and 238.

Moreover, as shown in FIG. 9, a temperature detecting terminal 236 and thermo-sensitive device 246 connected to the temperature detecting terminal 236 are provided inside the case 202. The thermo-sensitive device 246 is a thermistor whose resistor value changes corresponding to temperature. One end of the thermo-sensitive device 246 is connected to the temperature detecting terminal 236, and the other end of the thermo-sensitive device 246 is connected to the negative electrode terminal 238. Further, as shown in FIG. 9, a first intermediate voltage terminal 242 electrically connected between the series wiring of the two battery cells 231 and 232, and a second middle terminal 244 electrically connected between the series wiring of the two battery cells 232 and 233 are provided inside the case 202. In the second-type battery pack 200, the output voltage of the battery cells 231, 232, and 233 can be individually measured from outside by the positive electrode terminal 240, the negative electrode terminal 238, a first middle terminal 242 and a second middle terminal 244.

As shown in FIG. 7, the case 202 is formed in a pillar shape having a cross-sectional shape where one ellipse is connected to an approximately half ellipse, forming a T-shape to fit with the external shape of the three battery cells 231, 232, and 233 that are arranged triangularly therein. The cross sectional area of the case 202 of the second-type battery pack 200 is larger than the cross sectional area of the case 102 of the first-type battery pack 100.

A positive connecting port 210 that exposes the positive electrode terminal 240, a negative connecting port 208 that exposes the negative electrode terminal 238, a temperature detection connecting port 206 that exposes the temperature detecting terminal 236, a first intermediate voltage connecting port 212 that exposes the first intermediate voltage terminal 242, and a second intermediate voltage connecting port 214 that exposes the second intermediate voltage terminal 244 are formed on one end portion 202a of the case 202. Further, a slit-shaped incision portion 204 is formed on the one end portion 202a of the case 202. The incision portion 204 is formed at a position corresponding to the projecting portion 20 provided for the battery pack socket 16 of the charger 10.

A cover portion 216 is formed on the other end portion 202b of the case 202. A latch portion 218 for engaging with the electric power tool and a push portion 220 for moving the latch portion 218 are formed on the cover portion 216. The latch portion 218 and the push portion 220 are also formed on a back surface not shown in FIG. 7.

Figure 11:
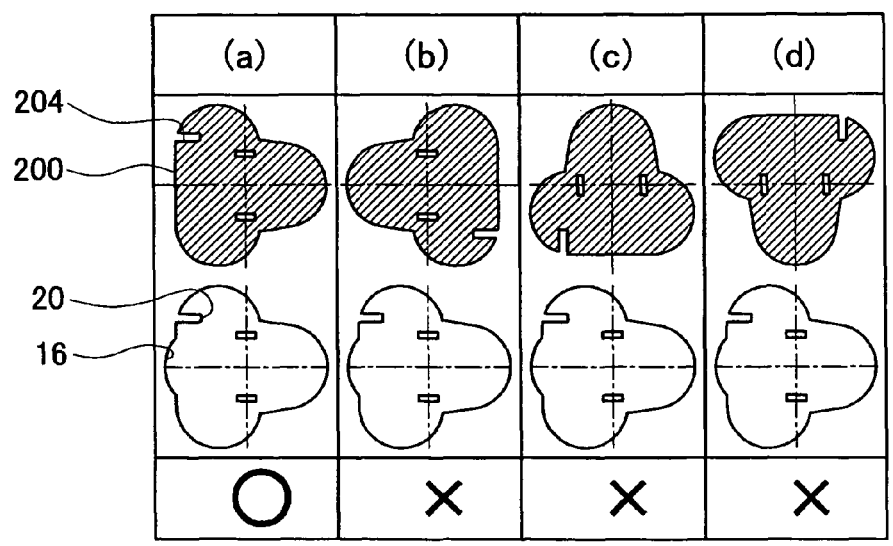
FIG. 11 is a view for explaining inserting directions of the second-type battery pack.

The second-type battery pack 200 is inserted into the battery pack socket 16 of the charger 10 by setting the end portion 202a of the case 202 as the insertion end. The end portion 202a of the case 202 functions as an insertion portion which is inserted into the battery pack socket 16. As shown in FIG. 11, the second-type battery pack 200 can be inserted into the battery pack socket 16 of the charger 10 only in a prescribed attitude. FIG. 11(a) shows the prescribed attitude of the second-type battery pack 200 with which the second-type battery pack 200 can be inserted into the battery pack socket 16. At this point, the projecting portion 20 formed on the battery pack socket 16 enters the concave portion 204 formed on the second-type battery pack 200, and does not interfere with the second-type battery pack 200. However, with the attitudes shown in FIG. 11(b) to FIG. 11(d), for example, the cross-sectional shape of the second-type battery pack 200 does not match with the opening shape of the battery pack socket 16, so that the second-type battery pack 200 is not inserted into the battery pack socket 16. The battery pack socket 16 has a shape that dose not allow insertion of the second-type battery pack 200 that is not in the prescribed attitude into the battery pack socket 16.

When the second-type battery pack 200 is inserted into the battery pack socket 16 of the charger 10, the output terminals 26 and 28 of the charger 10 respectively enter the positive connecting port 210 and the negative connecting port 208 of the second-type battery pack 200, making electrical connection with the positive electrode terminal 240 and the negative electrode terminal 238 of the second-type battery pack 200. Further, the second temperature input terminal 18 of the charger 10 enters the temperature detection connecting port 206 of the second-type battery pack 200, making electrical connection with the temperature detecting terminal 236 of the second-type battery pack 200. Moreover, the first intermediate voltage input terminal 30 and the second intermediate voltage input terminal 24 of the charger 10 respectively enter the first intermediate voltage connecting port 212 and the second intermediate voltage connecting port 214 of the second-type battery pack 200, making electrical connection with the first intermediate voltage terminal 242 and the second intermediate voltage terminal 244 of the second-type battery pack 200. Accordingly, the three battery cells 231, 232, and 233 and the thermo-sensitive device 246 of the second-type battery pack 200 are electrically connected to the charging control unit 40 of the charger 10. However, no electrical connection is made to the first temperature input terminal 22 of the charger 10. The charging control unit 40 detects that the second-type battery pack 200 has been connected based on voltage between the pair of output terminals 26 and 28, and starts charge control for charging the second-type battery pack 200. Charging power from the charging control unit 40 is supplied to the second-type battery pack 200 through the pair of output terminals 26 and 28. At this point, the charging control unit 40 adjusts charging current based on detected temperature by the thermo-sensitive device 246 of the second-type battery pack 200.

As described above, the battery pack set of the present embodiment can charge the two types of battery packs 100 and 200, having different shapes of insertion portion and different output voltages, using the same charger 10. The battery pack socket 16 formed on the charger 10 receives the first-type battery pack 100 only in the particular attitude as shown in FIG. 10(a) and can receive the second-type battery pack 200 only in the particular attitude as shown in FIG. 11(a). Then, the first-type battery pack 100 or the second-type battery pack 200 that was inserted thereof can be connected to the same pair of charging electrodes 26 and 28.

Figure 12:
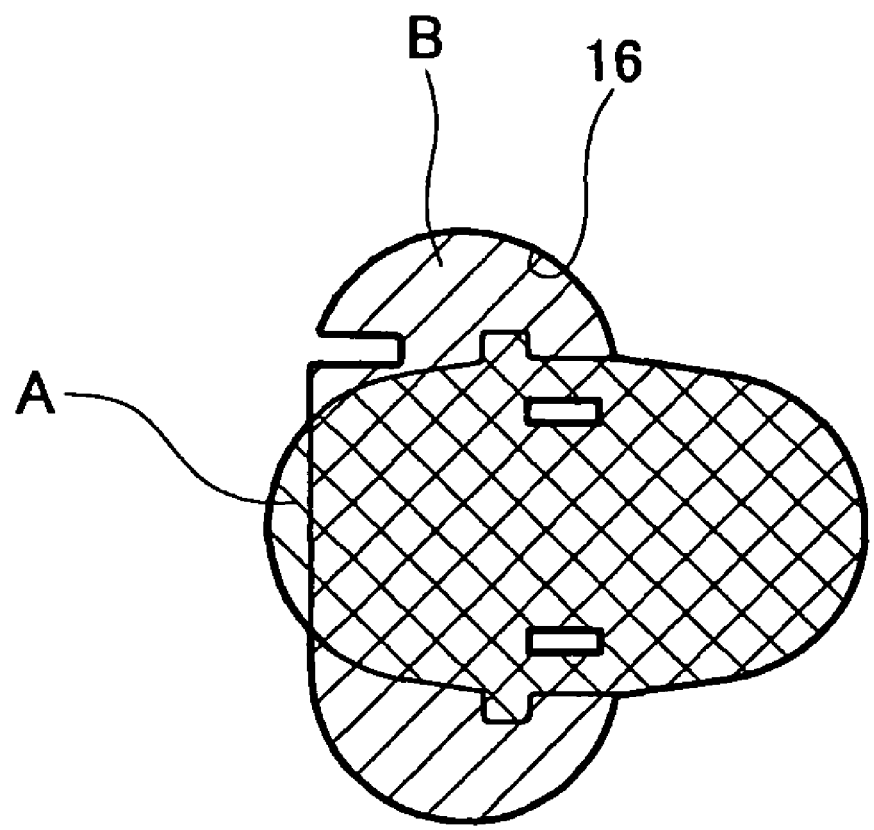
FIG. 12 shows areas of the battery pack socket occupied when each of the battery packs is inserted.

FIG. 12 shows areas of the battery pack socket 16 that are occupied during the insertion of the first-type battery pack 100 and the second-type battery pack 200. Area A shows the occupying area of the first-type battery pack 100 when inserted into the battery pack socket 16 and area B shows the occupying area of the second-type battery pack 200 when inserted therein. In FIG. 12, the area A where the first-type battery pack 100 is inserted is shown by applying diagonally right-down hatch. The area B where the second-type battery pack 200 is inserted is shown by applying diagonally left-down hatch. Cross hatch is applied to a common area where the areas A and B overlap. As shown in FIG. 12, in the battery pack socket 16, the area A where the first-type battery pack 100 is inserted and the area B where the second-type battery pack 200 is inserted, at least in part has an area that is commonly occupied by the first-type battery pack 100 and the second-type battery pack 200. As described, by forming the battery pack socket 16 such that the areas A and B at least in part overlap, the battery pack socket 16 can be constituted relatively small. Thus the excess enlargement of the charger 10 is prevented.

The charger 10 of the present embodiment charges the two types of battery packs 100 and 200, having different shapes, with the single battery pack socket 16. Accordingly, the opening of the battery pack socket 16 is larger than the cross-section of the first-type battery pack 100 and of the second-type battery pack 200. The opening of the battery pack socket 16 is significantly large for the first-type battery pack 100 (being smaller than the second-type battery pack 200), and thereby the battery pack socket 16 involves a significant residual area when the first-type battery pack 100 is inserted into the battery pack socket. The residual area is shown by an area applied only with diagonally left-down hatch in FIG. 12. Generally, the residual area allows the first-type battery pack 100 to be inserted into the battery pack socket 16 in various attitudes, which makes it difficult to set the limitation of insertion attitudes to a certain direction or orientation of the first-type battery pack 100.

With regard to the above-described problem, the projecting portion 20 is formed within the battery pack socket 16, and the projecting portions 108 is formed on the case 102 of the first-type battery pack 100. The projecting portion 20 of the battery pack socket 16 is formed in the above-described residual area of the battery pack socket 16 where the second-type battery pack 200 fits but the first-type battery pack 100 dose not fit. And, the projecting portions 108 are formed on the case 102 of the first-type battery pack 100 such that the projecting portions 108 position in the residual area when the first-type battery pack 100 is inserted into the battery pack socket 16 in the prescribed attitude. Thus, the insertion attitude of the first-type battery pack 100 can be limited to one certain attitude. Since the projecting portions 108 formed on the first-type battery pack 100 are in the residual area, the necessity and trouble of forming concave portions corresponding to the projecting portions 108 in the battery pack socket 16 is saved. Enlargement or shape complication of the battery pack socket 16 is thus prevented.

The specific embodiment of the present teachings is described above, but this merely is exemplary and should not be construed to restrict the scope of the present invention. The art set forth in the claims includes variations and modifications that are not limited the specific embodiment set forth above.

Furthermore, the technical elements disclosed in the present specification and figures may be utilized separately or in combination and are not limited to the combination set forth in the claims at the time of filing of the application. Furthermore, the art disclosed in the present specification and figures may be utilized to simultaneously realize a plurality of aims or to realize one of these aims.

What is claimed is:

1. A charger adapted to charge either one of a first-type battery pack and a second-type battery pack, wherein both of the first-type battery pack and the second-type battery pack have an insertion portion respectively, the shape of the insertion portion of the first-type battery pack is different from the shape of the insertion portion of the second-type battery pack, and a concave portion is formed on the insertion portion of the second-type battery pack, the charger comprising:

a housing having a battery pack socket into which the insertion portion of the first-type battery pack and the insertion portion of the second-type battery pack can be selectively inserted in respective prescribed attitudes, wherein the battery pack socket has a partial area for commonly accepting the insertion portion of the first-type battery pack and the insertion portion of the second-type battery pack, at least one non-retractable projecting portion is formed within the battery pack socket in an area of the battery pack socket where the second-type battery pack fits but the first-type battery pack does not fit, the at least one projecting portion is configured to enter into the concave portion formed on the insertion portion of the second-type battery pack when the second-type battery pack is inserted in the battery pack socket, and the battery pack socket has a shape that does not allow insertion of either the insertion portion of the first-type battery pack or the insertion portion of the second-type battery pack into the battery pack socket in any attitude other than the respective prescribed attitudes of the first-type battery pack and the second battery pack;

a charging control unit housed in the housing; and at least a pair of output terminals disposed in the battery pack socket, wherein the pair of output terminals is electrically connected to the first-type battery pack when the insertion portion of the first-type battery pack in the prescribed attitude is inserted into the battery pack socket, and the pair of output terminals is electrically connected to the second-type battery pack when the insertion portion of the second-type battery pack in the prescribed attitude is inserted into the battery pack socket.

2. A charger as in claim 1, wherein the both the first-type battery pack and the second-type battery pack respectively have at least a pair of electrode terminals, and a positional relationship of the pair of electrode terminals of the first-type battery pack is identical with a positional relationship of the pair of electrode terminals of the second-type battery pack, and
wherein the pair of the output terminals can be selectively connected to the pair of electrode terminals of the first-type battery pack and the pair of electrode terminals of the second-type battery pack.

3. A charger as in claim 1, wherein the first-type battery pack comprises two battery cells arranged parallel to one another, and the second-type battery pack comprises three battery cells arranged parallel to one another to form a triangular configuration.

4. A charger as in claim 1, wherein the charging control unit detects a type of battery pack inserted into the battery pack socket and changes a charge control process depending on the detected type of the battery pack.

5. A charger as in claim 1, wherein the non-retractable projecting portion is positioned on a sidewall of the battery pack socket, a bottom plate of the battery pack socket, or any combination thereof.

6. A charger as in claim 1, wherein the non-retractable projecting portion is formed on a sidewall of the battery pack socket and bottom plate of the battery pack socket.

7. A combination of a first-type battery pack, a second-type battery pack and a charger, the combination comprising:

the first-type battery pack having an insertion portion;

the second-type battery pack having an insertion portion, wherein the shape of the insertion portion of the first-type battery pack is different from the shape of the insertion portion of the second-type battery pack and a concave portion is formed on the insertion portion of the second-type battery pack; and the charger, the charger comprising:

a housing having a battery pack socket into which the insertion portion of the first-type battery pack and the insertion portion of the second-type battery pack can be selectively inserted in respective prescribed attitudes, wherein the battery pack socket has a partial area for commonly accepting the insertion portion of the first-type battery pack and the insertion portion of the second-type battery pack, at least one non-retractable projecting portion is formed within the battery pack socket in an area of the battery pack socket where the second-type battery pack fits but the first-type battery pack does not fit, the at least one projecting portion is configured to enter into the concave portion formed on the insertion portion of the second-type battery pack when the second-type battery pack is inserted in the battery pack socket, and the battery pack socket has a shape that does not allow insertion of either the insertion portion of the first-type battery pack or the insertion portion of the second-type battery pack into the battery pack socket in any attitude other than the respective prescribed attitudes of the first-type battery pack; and the second battery pack;

a charging control unit housed in the housing; and at least a pair of output terminals disposed in the battery pack socket, wherein the pair of output terminals is electrically connected to the first-type battery pack when the insertion portion of the first-type battery pack in the prescribed attitude is inserted into the battery pack socket, and the pair of output terminals is electrically connected to the second-type battery pack when the insertion portion of the second-type battery pack in the prescribed attitude is inserted into the battery pack socket.

8. A combination as in claim 7, wherein the both the first-type battery pack and the second-type battery pack have at least a pair of electrode terminals, and a positional relationship of the pair of electrode terminals of the first-type battery pack is identical with a positional relationship of the pair of electrode terminals of the second-type battery pack, and wherein the pair of the output terminals can be selectively connected to the pair of electrode terminals of the first-type battery pack and the pair of electrode terminals of the second-type battery pack.

9. A combination as in claim 7, wherein the first-type battery pack comprises two battery cells arranged parallel to one another, and the second-type battery pack comprises three battery cells arranged parallel to one another to form a triangular configuration.

10. A combination as in claim 7, wherein the charging control unit detects a type of battery pack inserted into the battery pack socket and changes charge control process depending on the detected type of the battery pack.

11. A charger as in claim 7, wherein the non-retractable projecting portion is positioned on a sidewall of the battery pack socket, a bottom plate of the battery pack socket, or any combination thereof.

12. A charger as in claim 7, wherein the non-retractable projecting portion is formed on a sidewall of the battery pack socket and bottom plate of the battery pack socket.

13. A charger adapted to charge either one of a first-type battery pack and a second-type battery pack, wherein both of the first-type battery pack and the second-type battery pack have an insertion portion respectively, and the shape of the insertion portion of the first-type battery pack is different from the shape of the insertion portion of the second-type battery pack, and a concave portion is formed on the insertion portion of the second-type battery pack, the charger comprising:

a housing having a battery pack socket into which the insertion portion of the first-type battery pack can be selectively inserted in a first-type prescribed attitude and into which the insertion portion of the second-type battery pack can be selectively inserted in a second-type prescribed attitude, the battery pack socket having a shape defining a first area adapted to be occupied by the first-type battery pack inserted in the first-type prescribed attitude and defining a second area adapted to be occupied by the second-type battery pack inserted in the second-type prescribed attitude, the first and second areas having a common part overlapping each other, wherein the second area includes a not-common part that does not overlap with the first area, at least one projecting portion is formed within the not-common part, and the at least one projecting portion is fixed with respect to the battery pack socket and is positioned to enter the concave portion formed on the insertion portion of the second-type battery pack when the second-type battery pack is inserted in the battery pack socket;

a charging control unit housed in the housing; and at least a pair of output terminals disposed in the battery pack socket, wherein the pair of output terminals is electrically connected to the first-type battery pack when the insertion portion of the first-type battery pack in the first-type prescribed attitude is inserted into the battery pack socket, and the pair of output terminals is electrically connected to the second-type battery pack when the insertion portion of the second-type battery pack in the second-type prescribed attitude is inserted into the battery pack socket.

14. A charger as in claim 13, wherein the first area also has a not-common part that is not overlapping with the second area.

15. A charger as in claim 13, wherein the non-retractable projecting portion is positioned on a sidewall of the battery pack socket, a bottom plate of the battery pack socket, or any combination thereof.

16. A charger as in claim 13, wherein the non-retractable projection portion is form on a sidewall of a battery pack socket and bottom plate of the battery pack socket.

* * * * *